June 1, 1943.  H. JUNGHANS  2,320,609
SECURING DEVICE FOR CLOCKS
Filed July 15, 1939
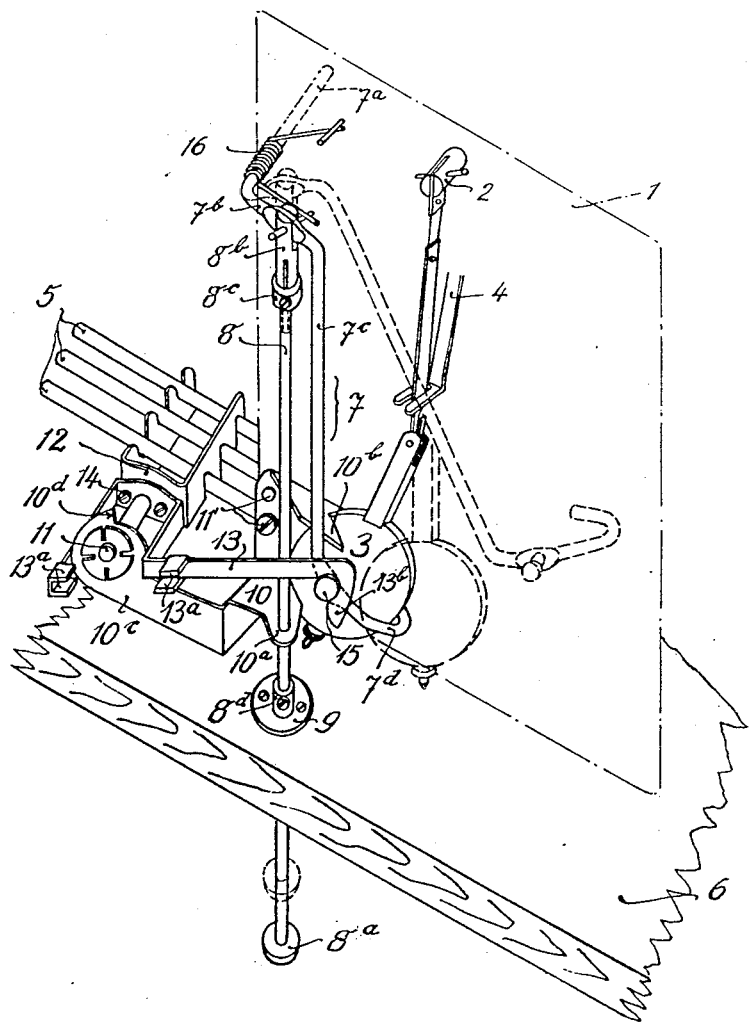
Inventor:
Helmut Junghans
By Young, Emery + Thompson
Attorneys Patented June 1, 1943

2,320,609

UNITED STATES PATENT OFFICE 2,320,609

SECURING DEVICE FOR CLOCKS

Helmut Junghans, Schramberg-Sulgen, Wurttemberg, Germany; vested in the Alien Property Custodian Application July 15, 1939, Serial No. 284,806
In Germany June 16, 1938

7 Claims. (Cl. 58—129)

This invention relates to a device for securing, during transportation, striking clocks with pendulum movement, and more particularly to a device which comprises a pendulum gripper tending to move into securing position in response to spring action and automatically disengaging itself during installation of the clock, and also a stationary engageable and disengageable securing member for the gong rods or other sound producing bodies.

It is the object of the invention to provide an improved securing device of this class capable of withstanding, during transportation, shocks that would cause disconnection of the pendulum securing members holding together under normal conditions of handling. The invention attains its object by interlocking the two securing units in such manner that a rotatable securing member, preferably gripping the gong rods at two opposite points, is provided and a hooked lever cooperating in the rotation of the securing member engages a rivet attached to the pendulum gripper.

The securing device according to the invention affords the advantage that owing to the additional security produced by the interlocking of the two units the clock during transportation will withstand exceptional shocks to which it will not be subjected any more after installation when special securing means for the gong rods may also be dispensed with.

One form of the invention is illustrated by way of example in the accompanying drawing which is a perspective view showing the device in securing position, the unlocked position being indicated by broken lines.

The rear plate 1 is provided with a stud 2 for suspending the pendulum 3. 4 is the crutch, 5 designates the three gong rods and 6 is the bottom of the case. All these parts are of the type usually found in clocks of this class.

The securing device is constructed as follows: Between the plates of the movement there is disposed the end 7a of a gripper lever 7 which runs at first parallel to the plane of the plates, then forms an approximately horizontally arranged offset portion 7b and thereupon extends downwardly in the same plane in approximately vertical direction to form the portion 7c until it terminates in the hook 7d. The portion 7b is engaged by a vertical push rod 8 passing at 9 through the bottom 6 and ending in the disc 8a. The length of the rod 8 can be adjusted by screwing the top end thereof more or less into the joint member 8b and clamping it by means of the ring 8c. The rod 8 is further guided at 10a by the plate angle 10 which at 11' is secured to the rear plate 1 by means of a screw and pin and which with stop portion 10b serves as companion gripper for the pendulum 3. An initially tensioned spring 16 positioned between the plate 1 and the crank portion 7b tends to swing the gripper 7 into securing position.

The portion 10c acts as support for the frictionally rotatable shaft 11 of the rakelike securing means 12 for the gong rods 5. To the rake 12 a lever 13 is attached by means of the screws 14, which has bent flaps 13a that can be manipulated by the fingers. A notch 10d serves as stop for the lever 13 when the securing means is turned into releasing position. The free end 13b of the lever 13 forms a hook which engages the rivet or pin 15 to interlock both securing units.

The securing device is used as follows: When the clock is to be shipped from the factory to a dealer or to be removed from one residence to another, both securing units are interlocked as indicated in the drawing. After the clock has been set up in the house, neither the gong rods nor the pendulum require further safeguarding against hard knocks, so that the connection effected between the gripper 7, the pendulum 3 and the companion gripper 10b by the pressure of the spring 16 will suffice. The lever 13 is therefore taken off from the rivet 15 and turned counter-clockwise up to the stop 10d so that the rake jaws above and below will be parallel to the plane of the gong rods which can thus oscillate freely. After disengagement of the securing means for the gong rods the clock can be placed on its support. Below the weight the rod 8 is pushed into the clock and moves the gripper 7 into the releasing position shown in broken lines.

I claim:

1. A device for securing striking clocks with pendulum movement and with sound producing means during transportation, comprising a pendulum gripper having means to move into pendulum gripping position, means for engaging the sound producing means of the clock, and means on said engaging means and the gripper to interlock both said gripper and engaging means to prevent movement of the pendulum and the sound producing means.

2. A device according to claim 1, in which the interlock means includes a hook on the engaging means and a pin on the gripper.

3. A device according to claim 1, in which a stop portion is provided against which the pendulum abuts when the pendulum is in its securing position.

4. A device for securing striking clocks with pendulum movement and with sound producing means during transportation, comprising a rotatably mounted pendulum gripper having means thereon to engage the pendulum, a rake-like securing means rotatably mounted to engage the sound producing means, a lever mounted on the securing means having a hook on one end thereof, and means on the gripper which is adapted to be engaged by the hook when the gripper and securing means are in securing position in connection with their respective elements to lock the pendulum and sound producing means during transportation.

5. A device for securing striking clocks with pendulum movement and with sound producing means during transportation, comprising a pendulum gripper and an engageable and disengageable means for securing the sound producing means of the clock and including means to interlock with the gripper whereby the pendulum and sound producing means are both held in secured positions, the means for engaging the sound producing means being a rotatable element engageable at a plurality of points on the sound-producing means.

6. A device for securing striking clocks with pendulum movement and with sound producing means during transportation, comprising a pendulum gripper and an engageable and disengageable means for securing the sound producing means of the clock and including means to interlock with the gripper whereby the pendulum and sound producing means are both held in secured position, the interlocking means comprising a hook on the securing means and a pin on the pendulum gripper.

7. A device for securing striking clocks with pendulum movement and with sound producing means during transportation, comprising a pendulum gripper, means for automatically disengaging the pendulum from the gripper during installation of the clock, an engageable and disengageable means for securing the sound producing means of the clock and including means to interlock with the gripper whereby the pendulum and sound producing means are both held in secured position, and a bracket provided with a stop portion against which the pendulum abuts when the latter is in the securing position, the automatic means being in the form of a rod pivotally secured to the pendulum gripper, said bracket also having a portion acting as a guide for the rod, said engageable and disengageable means and the interlocking means being rotatably mounted in the bracket.

HELMUT JUNGHANS.